Patented Apr. 10, 1928.

1,665,413

UNITED STATES PATENT OFFICE.

PERCY HERBERT HEAD, OF ATTENBOROUGH, ENGLAND.

MANUFACTURE OF STRENGTHENED GLASS.

No Drawing. Application filed April 4, 1927, Serial No. 180,992, and in Great Britain March 15, 1926.

This invention relates to improvements in relation to the manufacture of strengthened glass.

The type of strengthened glass with which the invention is concerned is that comprising one or more sheets or layers of celluloid or equivalent material interposed between two or more sheets of glass.

Prior to this invention it has been found that the celluloid or equivalent material enclosed between the glass takes on colour after a period of exposure. An object of this invention is to overcome this disadvantage whilst at the same time securing efficient adhesion between the celluloid or equivalent material and glass in combination with clarity of vision and freedom from blemish.

The principal feature of this invention consists in the utilization of a chromatic stabilizing agent for the purpose of preventing or minimizing or deferring change of colour previously experienced with strengthened glass of the above type.

In carrying the invention into effect the arrangement may be such that the chromatic stabilizing agent is absorbed by the celluloid or equivalent material and by the gelatine or other preparation contacting with the glass so that the chromatic stabilizing action is rendered comparatively permanent.

In carrying the invention into effect the chromatic stabilizing agent is conveniently used in conjunction with industrial spirit together with a proportion of sufficient solvent to soften the surfaces of the celluloid, or equivalent material and the gelatine or other material with which the surfaces of the glass are prepared.

In practice it has been found that a particular solution or mixture incorporating the chromatic stabilizing agent has particularly advantageous results and the agent in question functions not only to prevent or minimize change of colour but also assists in the process of adhesion and in ensuring clarity of vision and freedom from blemish.

A particular feature of the invention may be said therefore to reside in the utilization of industrial spirit, amyl acetate and tetrachlorethane in conjunction as a combined solvent, adhesive and chromatic stabilizing agent for manufacture of strengthened glass of the type set forth. Primarily both the industrial spirit and the amyl acetate are solvents for dissolving the surfaces of the celluloid or equivalent material and that of the gelatine or other material of which the glass is prepared whilst primarily the tetrachlorethane is a chromatic stabilizing agent for preventing or minimizing change of colour. At the same time if the tetrachlorethane is not included not only is its effect as a chromatic stabilizing agent lost but additionally the adhesive properties of the mixture are adversely affected and the clarity and freedom from blemish of the completed article are seriously impaired.

In carrying the invention into effect each sheet of glass prepared on one surface with a gelatine deposit and the celluloid are independently immersed in one bath containing the industrial spirit, amyl acetate and tetrachlorethane and subsequently brought into contact and pressed together, whilst in an alternative arrangement the glass and celluloid are first immersed in a bath of, say two of the ingredients, such as industrial spirit and amyl acetate, and subsequently in the second bath of tetrachlorethane. The glass and celluloid are brought into contact immediately after immersion and whilst still wet.

In a preferred embodiment of the invention each sheet of glass is first prepared by a deposit of gelatine on one surface of each piece of glass. The gelatine is deposited in any convenient manner and preferably a solution of one gramme of gelatine to one fluid ounce of water is utilized. One of the sheets of glass is then immersed in a bath of industrial spirit, amyl acetate and tetrachlorethane and whilst still immersed the celluloid or equivalent material is placed thereon in contact with the gelatine. On the top of the celluloid so positioned the remaining sheet of glass is placed with the gelatine again in contact with the celluloid. The gelatine positioned between the sheets of glass is now immersed in the bath. The three parts are then lightly pressed together and removed from the bath. Sufficient pressure is then applied to cause the gelatine to adhere firmly to the glass. In the manufacture of comparatively small articles manual pressure may in many cases be sufficient to effect satisfactory adhesion whilst in the manufacture of bigger articles a press may be utilized having platens lined with soft rubber, preferably vulcanized.

In practical experience it has been found that a particularly efficacious mixture or solution is constituted by two parts of tetrachlorethane, three parts of amyl acetate (commercial) and three parts of industrial spirit of good quality.

The invention marks an important departure in the art, firstly in that it provides against discolouration of the celluloid and gelatine or their equivalents, secondly in that the cost of manufacture is cheapened by virtue of substantially light pressure being required for effecting adhesion than in existing processes so that the percentage of breakages is considerably reduced, and thirdly by virtue of the use of the particular solution or mixture described which ensures in combination effective adhesion, freedom from blemish, clarity of vision, uniformity, and at the same time provides against change of colour.

It will be appreciated that after immersion in the bath and after the parts have been pressed together the tetrachlorethane cannot evaporate and is consequently in effect completely absorbed by the celluloid and gelatine or their equivalent materials. This may be said to ensure permanence of the chromatic stabilizing action.

Finally, it is to be noted that the invention may also be utilized in connection with the use of coloured or tinted celluloid, since the chromatic stabilizing agent utilized will not in any way render such celluloid or equivalent material colourless but will function to prevent such material from changing colour after assembly between the sheets of glass.

I claim:—

1. In the manufacture of strengthened glass, a plurality of sheets of glass, a celluloid strengthening sheet between adjacent glass sheets, a cementing material for uniting the celluloid and the glass sheets that is a solvent for the celluloid, and a chromatic stabilizing agent which has the property of combining with the said solvent and cementing material and of also increasing the adhesive properties thereof.

2. In the manufacture of strengthened glass, a plurality of glass sheets, celluloid interposed between said sheets, a material having the properties of gelatine deposited on the glass surfaces which coact with the celluloid and said treated glass and celluloid being immersed in a mixture of amyl acetate, industrial spirit and tetrachlorethane prior to assembly.

3. In the manufacture of strengthened glass, a plurality of glass sheets, celluloid interposed between said glass sheets, gelatine deposited on the glass surfaces which coact with said celluloid, one or more baths of amyl acetate, industrial spirit and tetrachlorethane, said gelatine treated glass and celluloid being immersed in said bath or baths, assembled while immersed and subsequently caused to adhere by the application of pressure.

4. Laminated glass, comprising a plurality of sheets of glass having interposed between adjacent sheets a celluloid strengthening sheet, a cementing material for uniting said celluloid sheet to the glass sheets, and a combined solvent and chromatic stabilizing mixture, comprising amyl acetate and tetrachlorethane.

5. Laminated glass, comprising a plurality of sheets of glass having interposed between adjacent sheets a celluloid strengthening sheet, a cementing material for uniting said celluloid sheet to the glass sheets, and a combined solvent and chromatic stabilizing mixture comprising industrial spirit, and tetrachlorethane.

6. Laminated glass, comprising a plurality of sheets of glass having interposed between adjacent sheets a celluloid strengthening sheet, a cementing material for uniting said celluloid sheet to the glass sheets, and a combined solvent and chromatic stabilizing mixture comprising industrial spirit, amyl acetate, and tetrachlorethane.

7. Laminated glass, comprising a plurality of sheets of glass having interposed between adjacent sheets a celluloid strengthening sheet, a cementing material for uniting said celluloid sheet to the glass sheets, and a combined solvent and chromatic stabilizing mixture comprising industrial spirit, amyl acetate, and tetrachlorethane in substantially the proportions of 3 parts of industrial spirit, 3 parts of amyl acetate, and 2 parts of tetrachlorethane.

PERCY HERBERT HEAD.